United States Patent
Yang

(10) Patent No.: US 12,107,315 B2
(45) Date of Patent: *Oct. 1, 2024

(54) WATER-RESISTANT ELEMENT, EXTERNAL CONNECTION WIRE MODULE, AND ANTENNA BOX MODULE

(71) Applicant: Taoglas Group Holdings Limited, Enniscorthy (IE)

(72) Inventor: Tsai-Yi Yang, Taoyuan (TW)

(73) Assignee: Taoglas Group Holdings Limited, Enniscorthy (IE)

( * ) Notice: Subject to any disclaimer, the term of this patent is extended or adjusted under 35 U.S.C. 154(b) by 23 days.

This patent is subject to a terminal disclaimer.

(21) Appl. No.: 18/071,951

(22) Filed: Nov. 30, 2022

(65) Prior Publication Data

US 2023/0208007 A1    Jun. 29, 2023

Related U.S. Application Data

(63) Continuation of application No. 17/211,010, filed on Mar. 24, 2021, now Pat. No. 11,522,264.

(30) Foreign Application Priority Data

Mar. 27, 2020    (TW) ................................. 109110585

(51) Int. Cl.
*H01Q 1/02* (2006.01)
*H01Q 1/42* (2006.01)
(Continued)

(52) U.S. Cl.
CPC ................. *H01Q 1/02* (2013.01); *H01Q 1/42* (2013.01); *H02G 3/081* (2013.01); *H02G 3/086* (2013.01);
(Continued)

(58) Field of Classification Search
CPC .......... H01Q 1/42; H02G 3/081; H02G 3/088; H02G 15/013; H02G 3/086; H02G 15/113; H02G 15/188; H02G 15/14
See application file for complete search history.

(56) References Cited

U.S. PATENT DOCUMENTS 5,316,499 A    5/1994  Scannelli et al.
6,358,082 B1    3/2002  Letourneau
(Continued)

FOREIGN PATENT DOCUMENTS

CN    210670038    6/2020
TW    201124591    7/2011
WO    2016190824    12/2016

*Primary Examiner* — Wei (Victor) Y Chan
(74) *Attorney, Agent, or Firm* — Garson & Gutierrez, PC

(57) ABSTRACT

A water-resistant element, adapted to an opining, comprising a deformable body, a first plate and a second plate is provided. The first plate is disposed at and against a first side of the deformable body. The second plate is disposed at and against a second side of the deformable body. When the deformable body is disposed in the opening, a relative displacement between the first plate and the second plate is used to change a shape of the deformable body such that the deformable body closely fits the opening in order to block moisture from entering into the opening. In addition, an external connection wire module comprising the water-resistant element, an antenna box module comprising the external connection wire module and a method of fixing the water-resistant element at a housing are also provided.

13 Claims, 2 Drawing Sheets

(51) Int. Cl.
  *H02G 3/08* (2006.01)
  *H02G 15/013* (2006.01)
  *H02G 15/14* (2006.01)
  *H02G 15/188* (2006.01)

(52) U.S. Cl.
  CPC .......... *H02G 3/088* (2013.01); *H02G 15/013* (2013.01); *H02G 15/14* (2013.01); *H02G 15/188* (2013.01)

(56) References Cited

U.S. PATENT DOCUMENTS

| | | | |
|---|---|---|---|
| 7,210,941 B2 * | 5/2007 | Rosenberge | H01R 24/542 |
| | | | 439/63 |
| 8,534,484 B2 | 9/2013 | Rost et al. | |
| 8,870,602 B2 | 10/2014 | Cook et al. | |
| 10,431,873 B2 | 10/2019 | Zachara et al. | |
| 10,686,308 B1 | 6/2020 | Burks et al. | |
| 10,840,589 B2 | 11/2020 | Anderson | |
| 11,522,264 B2 * | 12/2022 | Yang | H02G 3/088 |
| 2021/0210912 A1 * | 7/2021 | Yang | H01R 13/639 |

\* cited by examiner

WATER-RESISTANT ELEMENT, EXTERNAL CONNECTION WIRE MODULE, AND ANTENNA BOX MODULE

PRIORITY

This application is a continuation of, and claims the benefit of priority to, U.S. patent application Ser. No. 17/211,010 filed Mar. 24, 2021 entitled "WATER-RESISTANT ELEMENT, EXTERNAL CONNECTION WIRE MODULE, ANTENNA BOX MODULE AND METHOD OF FIXING A WATER-RESISTANT ELEMENT AT A HOUSING", which claims the benefit of priority to Taiwanese Patent Application No. 109110585 filed on Mar. 27, 2020 of the same title, the contents of each of the foregoing being incorporated herein by reference in its entirety.

COPYRIGHT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE DISCLOSURE

1. Technological Field

The present disclosure is related to a water-resistant element, and in one exemplary aspect to an external connection wire module with the water-resistant element, an antenna box module with the external connection wire module and a method of fixing the water-resistant element at a housing.

2. Field of the Disclosure

A conventional antenna box module includes an antenna box and an external connection wire. The antenna box may include at least one antenna, a circuit board and a housing. The antenna is disposed on the circuit board, the circuit board is located in the housing and can be further disposed with a connector to couple to the external connection wire. In order to transmit signals of the antenna to another device, such conventional antenna box modules can be connected to the other device through the external connection wire. Specifically, at the antenna box, an end of the external connection wire is provided with a wire-end connector to couple to the connector disposed on the circuit board in the antenna box.

In the prior art, the connector on the circuit board in the antenna box and the wire-end connector of the external connection wire are assembled and joined in a way that external dust or moisture can easily enter the antenna box, resulting in the damaging of electronic components in the antenna box.

SUMMARY

In one aspect, a water-resistant element adapted to an opening is disclosed. In one embodiment, the water-resistant element includes a deformable body; a first plate, disposed at and against a first side of the deformable body; and a second plate, disposed at and against a second side of the deformable body. When the deformable body is disposed in the opening, a relative displacement between the first plate and the second plate is used to change a shape of the deformable body such that the deformable body closely fits the opening in order to block moisture and/or dust from entering into the opening.

In one variant, the water-resistant element further includes an adjusting element penetrating through the first plate, the deformable body and the second plate, wherein the adjusting element is used to create the relative displacement.

In another variant, the adjusting element is a screw bolt, the first plate and the second plate respectively have a first screw hole and a second screw hole corresponding to the screw bolt, and the screw bolt is rotatable relatively to the first screw hole and the second screw hole in order to create the relative displacement.

In yet another variant, the relative displacement is used to change the shape of the deformable body in a direction perpendicular to the relative displacement.

In another aspect, an external connection wire module is disclosed. In one embodiment, the external connection wire module includes a water-resistant element having a deformable body; a first plate, disposed at and against a first side of the deformable body; and a second plate, disposed at and against a second side of the deformable body, wherein a relative displacement between the first plate and the second plate is used to change a shape of the deformable body; and an external connection wire, penetrating through the first plate, the deformable body and the second plate.

In one variant, the water-resistant element further includes an adjusting element penetrating through the first plate, the deformable body and the second plate, wherein the adjusting element is used to create the relative displacement.

In another variant, the adjusting element is a screw bolt, the first plate and the second plate respectively have a first screw hole and a second screw hole corresponding to the screw bolt, and the screw bolt is rotatable relatively to the first screw hole and the second screw hole in order to create the relative displacement.

In yet another variant, the relative displacement is used to change the shape of the deformable body in a direction perpendicular to the relative displacement.

In yet another variant, the external connection wire is a coaxial cable.

In yet another aspect, an antenna box module is disclosed. In one embodiment, the antenna box module includes an antenna box having a housing and a circuit board, the circuit board having an antenna and is disposed in the housing; and an external connection wire module that includes a water-resistant element, the water-resistant element including a deformable body disposed in an opening of the housing; a first plate, disposed at and against a first side of the deformable body; a second plate, disposed at and against a second side of the deformable body; and an adjusting element, that penetrates through the first plate, the deformable body and the second plate and being used to create a relative displacement between the first plate and the second plate; and an external connection wire, that penetrates through the first plate, the deformable body and the second plate and being electrically connected to the antenna. The relative displacement is used to change a shape of the deformable body such that the deformable body closely fits the opening in order to block moisture and/or dust from entering into the opening.

In one variant, the adjusting element is a screw bolt, the first plate and the second plate respectively have a first screw hole and a second screw hole corresponding to the screw bolt, and the screw bolt is rotatable relatively to the first screw hole and the second screw hole in order to create the relative displacement.

In another variant, the relative displacement is used to change the shape of the deformable body in a direction perpendicular to the relative displacement.

In yet another variant, the external connection wire is a coaxial cable.

In yet another aspect, a method of fixing a water-resistant element at a housing is disclosed. In one embodiment, the method includes providing the water-resistant element, the water-resistant element including a deformable body; a first plate, disposed at and against a first side of the deformable body; a second plate, disposed at and against a second side of the deformable body; and an adjusting element, penetrating through the first plate, the deformable body and the second plate; placing the deformable body in an opening of the housing; and operating the adjusting element to create a relative displacement between the first plate and the second plate, wherein the relative displacement is used to change a shape of the deformable body such that the deformable body closely fits the opening in order to block moisture from entering into the opening.

In yet another aspect, a way to provide a water-resistant element, an external connection wire module and an antenna box module, such that an assembly way between connectors can prevent external dust or moisture from entering the antenna box is disclosed.

In yet another aspect, a way to provide a method of fixing a water-resistant element at a housing to prevent external dust or moisture from entering the housing is disclosed.

In yet another aspect, a water-resistant element, adapted to an opening includes a deformable body, a first plate and a second plate is disclosed. The first plate is disposed at and against a first side of the deformable body. The second plate is disposed at and against a second side of the deformable body. When the deformable body is disposed in the opening, a relative displacement between the first plate and the second plate is used to change a shape of the deformable body such that the deformable body closely fits the opening in order to block moisture from entering into the opening.

In one variant, the water-resistant element further includes an adjusting element penetrating through the first plate, the deformable body and the second plate. The adjusting element is used to create the relative displacement.

In another variant, the adjusting element is a screw bolt. The first plate and the second plate respectively have a first screw hole and a second screw hole corresponding to the screw bolt. The screw bolt is rotatable relatively to the first screw hole and the second screw hole in order to create the relative displacement.

In yet another variant, the relative displacement is used to change the shape of the deformable body in a direction perpendicular to the relative displacement.

In yet another aspect, an external connection wire module includes a water-resistant element and an external connection wire. The water-resistant element includes a deformable body, a first plate and a second plate. The first plate is disposed at and against a first side of the deformable body. The second plate is disposed at and against a second side of the deformable body. A relative displacement between the first plate and the second plate is used to change a shape of the deformable body. The external connection wire penetrates through the first plate, the deformable body and the second plate.

In one variant, the water-resistant element further includes an adjusting element penetrating through the first plate, the deformable body and the second plate. The adjusting element is used to create the relative displacement.

In another variant, the adjusting element is a screw bolt. The first plate and the second plate respectively have a first screw hole and a second screw hole corresponding to the screw bolt. The screw bolt is rotatable relatively to the first screw hole and the second screw hole in order to create the relative displacement.

In yet another variant, the relative displacement is used to change the shape of the deformable body in a direction perpendicular to the relative displacement.

In yet another variant, the external connection wire is a coaxial cable.

In yet another aspect, an antenna box module that includes an antenna box and an external connection wire module is disclosed. The antenna box includes a housing and a circuit board, wherein the circuit board has an antenna and is disposed in the housing. The external connection wire module includes a water-resistant element and an external connection wire. The water-resistant element includes a deformable body, a first plate, a second plate and an adjusting element. The deformable body is adapted to being disposed in an opening of the housing. The first plate is disposed at and against a first side of the deformable body. The second plate is disposed at and against a second side of the deformable body. The adjusting element penetrates through the first plate, the deformable body and the second plate and being used to create a relative displacement between the first plate and the second plate. The external connection wire penetrates through the first plate, the deformable body and the second plate and is electrically connected to the antenna. The relative displacement is used to change a shape of the deformable body such that the deformable body closely fits the opening in order to block moisture from entering into the opening.

In one variant, the adjusting element is a screw bolt. The first plate and the second plate respectively have a first screw hole and a second screw hole corresponding to the screw bolt. The screw bolt is rotatable relatively to the first screw hole and the second screw hole in order to create the relative displacement.

In another variant, the relative displacement is used to change the shape of the deformable body in a direction perpendicular to the relative displacement.

In yet another variant, the external connection wire is a coaxial cable.

In yet another aspect, a method of fixing a water-resistant element at a housing is disclosed that includes the following steps. First, the water-resistant element having a deformable body, a first plate, a second plate and an adjusting element is provided. The first plate is disposed at and against a first side of the deformable body. The second plate is disposed at and against a second side of the deformable body. The adjusting element penetrates through the first plate, the deformable body and the second plate. Next, the deformable body is placed in an opening of the housing. Next, the adjusting element is operated to create a relative displacement between the first plate and the second plate. The relative displacement is used to change a shape of the deformable body such that the deformable body closely fits the opening in order to block moisture from entering into the opening.

All Figures disclosed herein are© Copyright 2020-2021 Taoglas Group Holdings Limited. All rights reserved.

DETAILED DESCRIPTION

Figure 1:
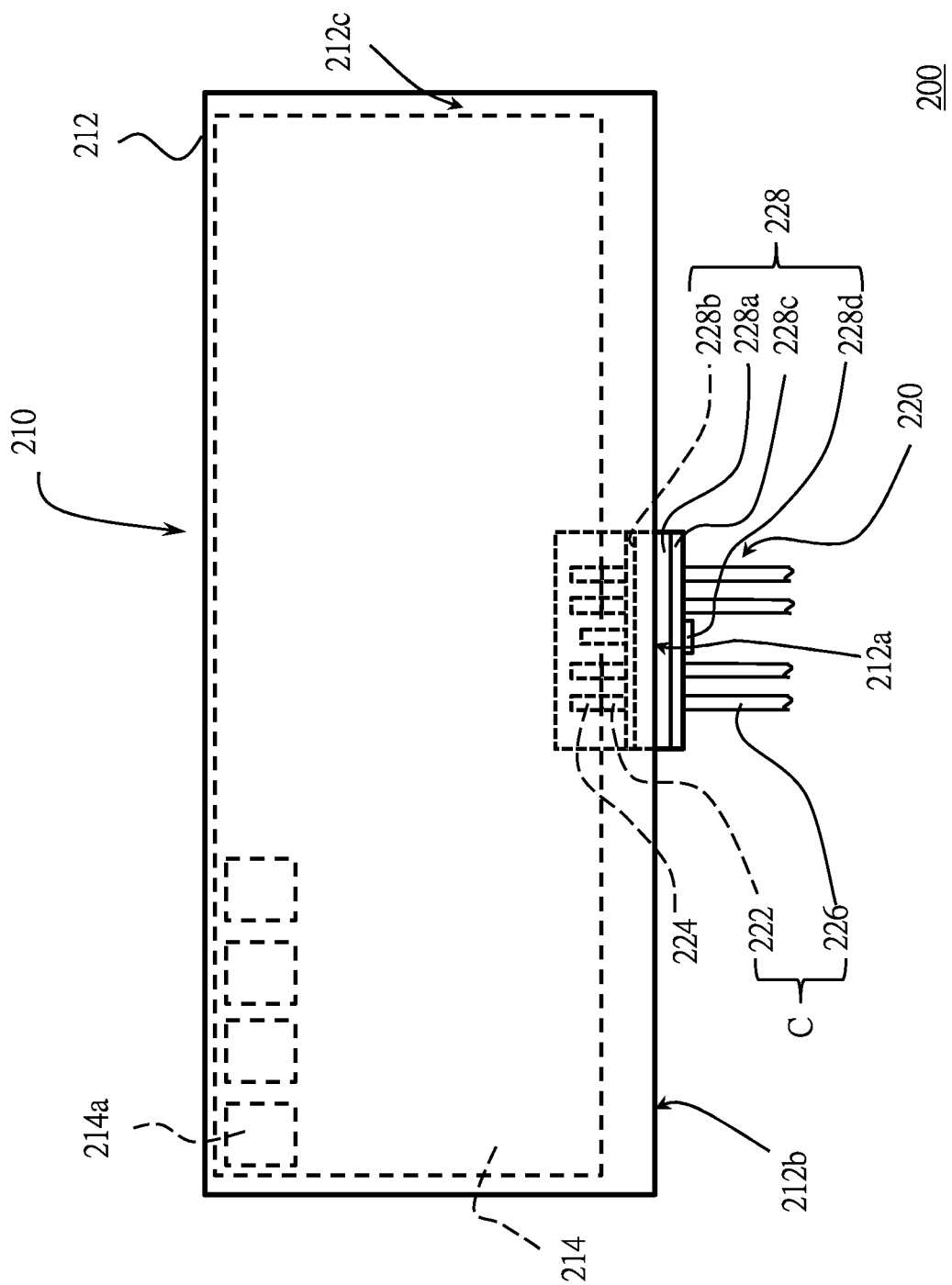
FIG. 1 shows a top schematic diagram of an antenna box module according to an embodiment of the present disclosure, wherein an antenna box is joined with an external connection wire module, in accordance with the principles of the present disclosure.

FIG. 1 shows a top schematic diagram of an antenna box module according to an embodiment of the present disclosure, wherein an antenna box is joined with an external connection wire module. Referring to FIG. 1, an antenna box module 200 of this embodiment may include an antenna box 210 and an external connection wire module 220. The antenna box 210 may include a housing 212 and a circuit board 214 disposed in the housing 212. The circuit board 214 may have multiple antennas 214a. Each of the antennas 214a is adapted to receive and/or transmit multiple wireless signals based on one of multiple wireless communication standards. In some implementations, these antennas 214a are in different types from one another; for example, these antennas 214a may have respective corresponding structures based on these different wireless communication standards. These wireless communication standards may include, without limitation, the Wi-Fi wireless communication standard, Bluetooth wireless communication standard, GPS wireless communication standard, 2G wireless communication standard, 3G wireless communication standard, 4G wireless communication standard, 5G wireless communication standard and/or WiMAX wireless communication standard.

Furthermore, the external connection wire module 220 may include a water-resistant element 228 and one or more external connection wires C. Each of the external connection wires C may include a first connector 222 and an external connection wire body 226. Moreover, the antenna box 210 may include one or more second connectors 224 disposed on the circuit board 214 and electrically connected to the circuit board 214. During use, one end of an external connection wire body 226 is connected to one first connector 222 to form one external connection wire C, such that the first connector 222 can be connected to, and be in electrical communication with, one second connector 224. The numbers of the first connectors 222, the external connection wire bodies 226 and the second connectors 224 are not specifically limited; however preferably, the numbers of the first connectors 222, the external connection wire bodies 226 and the second connectors 224 are equal. More details about the external connection wire C (e.g., a coaxial cable) and the second connector 224 are described in commonly owned U.S. patent application Ser. No. 17/141,998 filed Jan. 5, 2021 and entitled "Antenna Box Module, Connector Module and Coaxial Cable", the contents of which being incorporated herein by reference in its entirety. However, the external connection wire C and the second connector 224 in the embodiments of the present disclosure are not limited to being the coaxial cable and the second connector described in U.S. patent application Ser. No. 17/141,998 referenced supra but may be any external connection wire and connector that transmits and/or receives signals.

These second connectors 224 are disposed on the circuit board 214 by means of, for example but not limited to, surface mount technology (SMT). By wires (not shown) on the circuit board 214, each of the second connectors 224 is electrically connected to one or more of these antennas 214a. For example, one of these antennas 214a can be electrically connected to one external connection wire body 226 through the coupling between one second connector 224 and one corresponding first connector 222, so as to transmit and/or receive signals (e.g., Wi-Fi signals) of the antenna 214a to an external device (not shown). Another of the antennas 214a can be electrically connected to another external connection wire body 226 through coupling between another second connector 224 and another corresponding first connector 222, so as to transmit and/or receive signals (e.g., 4G signals) of the another antenna 214a to another external device (not shown). Yet another one of these antennas 214a can be electrically connected to two or more external connection wire bodies 226 through coupling between two or more other second connectors 224 and two or more corresponding first connectors 222, so as to transmit and/or receive signals (e.g., 5G signals) of another antenna 214a to another external device (not shown).

In some implementations, these antennas 214a are all antennas in the antenna box 210; in other words, all the antennas (i.e., the antennas 214a) in the antenna box 210 can be coupled to the outside jointly through these second connectors 224, without any other additionally provided connectors. Moreover, in some implementations, these antennas 214a and these external connection wires C are in one-to-one correspondence; that is, the number of these antennas 214a is equal to the number of these external connection wires C, and each of the external connection wires C is electrically connected to one unique one of these antennas 214a.

The housing 212 has an opening 212a which exposes these second connectors 224. The material of the housing 212 of the antenna box 210 may include a heat-resistant material such as, for example, plastic, and may be a mixture of PA resin and ABS resin, although other polymer types may be substituted in alternative implementations.

Figure 2:
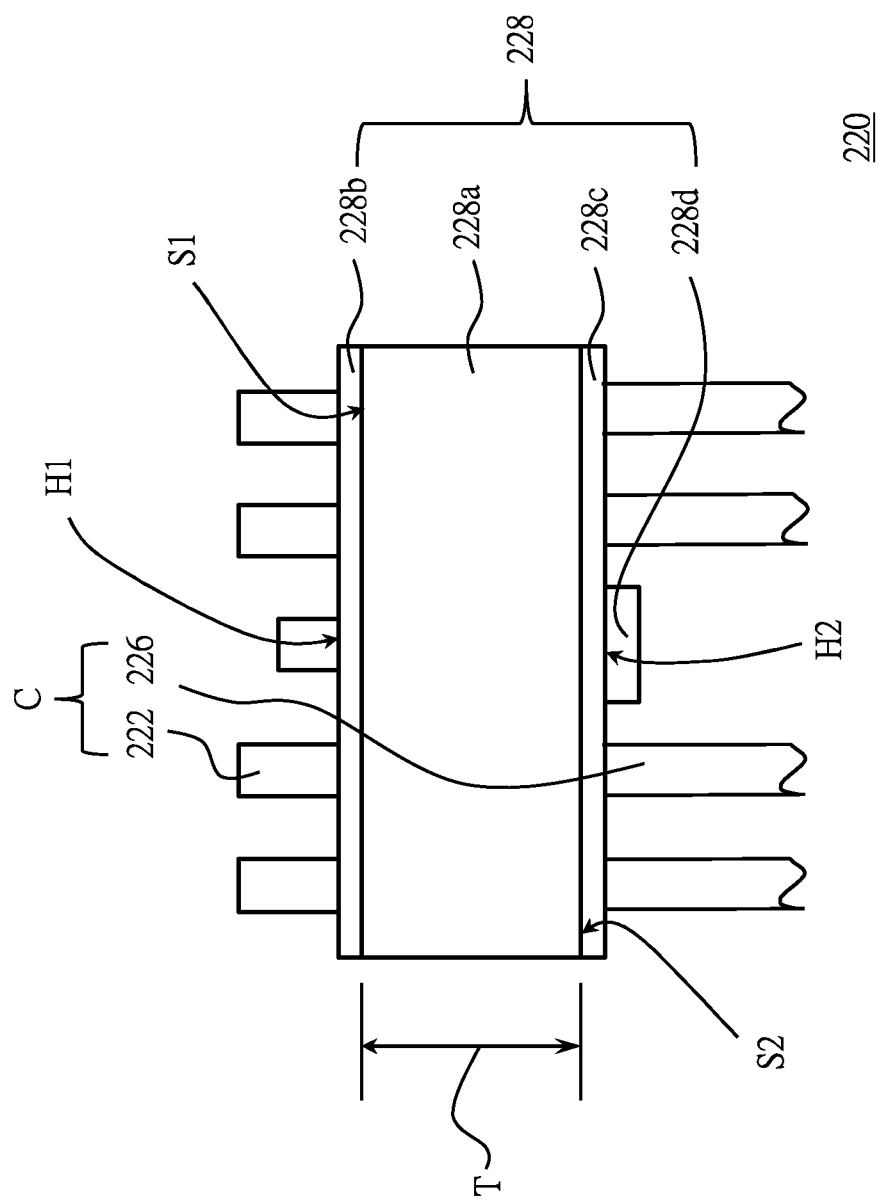
FIG. 2 shows an enlarged top schematic diagram of the water-resistant element and the external connection wires of the external connection wire module in FIG. 1 not yet disposed on a housing, in accordance with the principles of the present disclosure.

FIG. 2 shows an enlarged top schematic diagram of the water-resistant element and the external connection wires of the external connection wire module in FIG. 1 that have not yet been disposed on the housing. Referring to FIG. 2, the water-resistant element 228 includes a deformable body 228a, a first plate 228b and a second plate 228c. The first plate 228b may be disposed at and against a first side S1 of the deformable body 228a (in a material such as, for example, rubber). The second plate 228b may be disposed at and against a second side S2 of the deformable body 228a. The first side S1 and the second side S2 may be opposite to each other. In such a variant, the water-resistant element 228 may further include an adjusting element 228d penetrating through the first plate 228b, the deformable body 228a and the second plate 228c. The adjusting element 228d may include, for example, a screw bolt, and the first plate 228b and the second plate 228c respectively have a first screw hole H1 and a second screw hole H2 corresponding to the screw bolt, wherein the screw bolt can rotate relative to the first screw hole H1 or the second screw hole H2 to create a relative displacement between the first plate 228b and the second plate 228c. In some implementations, the relative displacement between the first plate 228b and the second plate 228c may be achieved through use of other devices other than the screw bolt. For example, a one-way ratcheting mechanism may allow the adjusting element 228d to tighten with respect to the first plate 228b thereby enabling the relative displacement without necessitating any type of special assembly tools (e.g., a screwdriver or allen key). In this implementation, the first plate 228*b* may be held in a fixed position within the housing 212. A user may then press the second plate 228*c* towards the first plate 228*b*, causing the deformable body 228*a* to deform in a direction that is generally orthogonal to the action. The one-way ratcheting mechanism may then engage such that the relative displacement between the first plate 228*b* and the second plate 228*c* prevents the second plate 228*c* from returning to its prior form. Regardless of the implementation chosen, the relative displacement between the first plate 228*b* and the second plate 228*c* may be used to change the shape of the deformable body 228*a* (to be described in detail below). Furthermore, each of the external connection wires C also penetrates through the first plate 228*b*, the deformable body 228*a* and the second plate 228*c*. When the water-resistant element 228 is not yet disposed on the housing 212 as shown in FIG. 2, an interval T is kept between the first plate 228*b* and the second plate 228*c*, and the deformable body 228*a* is not yet deformed and can be in a regular shape (e.g., a cylinder, cube, hexagonal cylinder, or other polygon-type shape) or have an irregular shape.

Referring to FIG. 1 and FIG. 2, when the antenna box module 220 is assembled, the water-resistant element 228 may be first disposed in the opening 212*a* of the housing 212 of the antenna box 210, such that the deformable body 228*a* is inserted in the opening 212*a* and the first connector 222 of each external connection wire C is connected to the corresponding second connector 224. Next, the adjusting element 228*d* is manipulated (e.g., by rotating the adjusting element 228*d* in the form of a screw bolt) to apply pressure on the first plate 228*b* and the second plate 228*c* to decrease the interval T between the first plate 228*b* and the second plate 228*c* (the amount of decrease in the interval T is the relative displacement between the first plate 228*b* and the second plate 228*c*), further allowing the deformable body 228*a* to deform in at least one direction perpendicular to the direction of interval T (i.e., perpendicular to the relative displacement) such that the deformable body 228*a* closely fits the opening 212*a*. Thus, the deformed deformable body 228*a* closely fitting the opening 212*a* is capable of preventing external dust or moisture from entering the inside of the housing 212 through the opening 212*a*.

According to the description above, the deformable body 228*a* of the water-resistant element 228 of this embodiment is deformable and thus closely fits the opening 212*a* of the housing 212 by means of the adjustment of the adjusting element 228*d*, so that the deformed deformable body 228*a* closely fitting the opening 212*a* is capable of preventing external dust or moisture from entering the inside of the housing 212 through the opening 212*a*. Therefore, compared to the prior art, electronic components in the housing 212 are unlikely to be affected and hence damaged by external dust or moisture.

In some implementations, the opening 212*a* of the housing 212 may be on one side surface 212*b* of the housing 212. In another embodiment, the opening 212*a* may also be located on a top surface 212*c* of the housing 212 or a bottom surface (not shown) opposite to the top surface 212*c*. When these second connectors 224 are located on the top surface 212*c* or the bottom surface of the housing 212, these second connectors 224 can be electrically connected to the circuit board 214 by means of welding, insertion, soldering and/or other types of known connection methods.

In some implementations, one or more of these antennas 214*a* in FIG. 1 may be replaced by other multiple electronic components having different functions. In other words, an electronic device including multiple electronic components (without an antenna function) having different functions can be used to substitute for the antenna box including antennas, wherein each of the electronic components is electrically connected to the corresponding one of these second connectors 224.

According to the description above, the embodiments of the present disclosure have one of the following or other advantages. The deformable body of the water-resistant element of the embodiments of the present disclosure is deformable and thus closely fits the opening of the housing by means of the adjustment of the adjusting element, so that the deformed deformable body closely fitting the opening is capable of preventing external dust or moisture from entering the inside of the housing through the opening. Therefore, compared to the prior art, the electronic components in the housing are unlikely to be affected and thus damaged by the external dust or moisture.

What is claimed is:

1. A water-resistant element comprising:
   a deformable body comprising a first surface and a second surface, the first surface and the second surface being parallel with one another;
   a first plate, the first plate being disposed against the first surface of the deformable body; and
   a second plate, the second plate being disposed against the second surface of the deformable body;
   wherein:
   when the first plate and the second plate are adjusted closer to one another, the adjustment causes the deformable body to change shape such that the deformable body is more effective at blocking moisture and/or dust from entering an opening as compared to prior to the adjustment of the first plate and the second plate.

2. The water-resistant element of claim 1, further comprising an adjusting element that penetrates through the first plate, the deformable body and the second plate, the adjusting element enabling the first plate and the second plate to be adjusted closer to one another.

3. The water-resistant element of claim 2, wherein the adjusting element comprises a screw bolt, the first plate and the second plate comprising a first hole and a second hole, respectively, the first hole and the second hole being sized to accommodate the screw bolt;
   wherein rotation of the screw bolt within the first hole and the second hole causes the adjustment resulting in the first plate and the second plate moving closer to one another.

4. The water-resistant element according to claim 1, wherein the deformable body expands in a direction perpendicular to relative motion of the first plate and the second plate during the adjustment of the first plate and the second plate such that the first plate and the second plate are closer to one another.

5. An external connection wire module, comprising:
   a water-resistant element, comprising:
   a deformable body comprising a first surface and a second surface, the first surface and the second surface being parallel with one another;
   a first plate, the first plate being disposed against the first surface of the deformable body; and
   a second plate, the second plate being disposed against the second surface of the deformable body, wherein when the first plate and the second plate are adjusted closer to one another, the adjustment causes the deformable body to change shape such that the deformable body is more effective at blocking moisture and/or dust from entering an opening as compared to prior to the adjustment of the first plate and the second plate; and one or more external connection wires, the one or more external connection wires penetrating through the first plate, the deformable body and the second plate.

6. The external connection wire module of claim 5, wherein the water-resistant element further comprises an adjusting element penetrating through the first plate, the deformable body and the second plate, wherein the adjusting element is used to create the adjustment.

7. The external connection wire module of claim 6, wherein the adjusting element comprises a screw bolt, the first plate and the second plate comprising a first hole and a second hole, respectively, the first hole and the second hole being sized to accommodate the screw bolt;

wherein rotation of the screw bolt within the first hole and the second hole causes the adjustment resulting in the first plate and the second plate moving closer to one another.

8. The external connection wire module of claim 5, wherein the deformable body expands in a direction perpendicular to relative motion of the first plate and the second plate during the adjustment of the first plate and the second plate such that the first plate and the second plate are closer to one another.

9. The external connection wire module of claim 8, wherein the one or more external connection wires each comprise a coaxial cable.

10. An antenna box module, comprising:
an antenna box, comprising a housing and a circuit board, wherein the circuit board comprises an antenna, the circuit board being disposed within the housing; and
an external connection wire module, comprising:
a water-resistant element, comprising:
a deformable body comprising a first surface and a second surface, the first surface and the second surface being parallel with one another, the deformable body being disposed in an opening of the housing;
a first plate, the first plate being disposed against the first surface of the deformable body;
a second plate, the second plate being disposed against the second surface of the deformable body; and
an adjusting element that penetrates through the first plate, the deformable body and the second plate, the adjusting element being used to adjust the first plate and the second plate closer to one another; and
one or more external connection wires, the one or more external connection wires penetrating through the first plate, the deformable body and the second plate;
wherein the adjustment causes the deformable body to change shape such that the deformable body is more effective at blocking moisture and/or dust from entering an opening of the housing as compared to prior to the adjustment of the first plate and the second plate.

11. The antenna box module of claim 10, wherein the adjusting element comprises a screw bolt, the first plate and the second plate comprising a first hole and a second hole, respectively, the first hole and the second hole being sized to accommodate the screw bolt;

wherein rotation of the screw bolt within the first hole and the second hole causes the adjustment resulting in the first plate and the second plate moving closer to one another.

12. The antenna box module of claim 11, wherein the deformable body expands in a direction perpendicular to relative motion of the first plate and the second plate during the adjustment of the first plate and the second plate such that the first plate and the second plate are closer to one another.

13. The antenna box module of claim 12, wherein the one or more external connection wires each comprise a coaxial cable.

* * * * *